US011274698B2

(12) United States Patent
Frydendal et al.

(10) Patent No.: US 11,274,698 B2
(45) Date of Patent: Mar. 15, 2022

(54) FLUID FILM BEARING FOR A WIND TURBINE

(71) Applicant: Siemens Gamesa Renewable Energy A/S, Brande (DK)

(72) Inventors: Niels Karl Frydendal, Herning (DK); Troels Kanstrup, Rask Moelle (DK); Dennis Olesen, Aarhus (DK); Kim Thomsen, Skørping (DK); Morten Thorhauge, Aarhus (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/648,868

(22) PCT Filed: Sep. 19, 2018

(86) PCT No.: PCT/EP2018/075321
§ 371 (c)(1),
(2) Date: Mar. 19, 2020

(87) PCT Pub. No.: WO2019/057753
PCT Pub. Date: Mar. 28, 2019

(65) Prior Publication Data
US 2020/0284292 A1 Sep. 10, 2020

(30) Foreign Application Priority Data
Sep. 20, 2017 (EP) .................... 17192112

(51) Int. Cl.
F16C 17/03 (2006.01)
F16C 27/06 (2006.01)
(Continued)

(52) U.S. Cl.
CPC .......... F16C 17/03 (2013.01); F16C 32/0677 (2013.01); F03D 80/70 (2016.05);
(Continued)

(58) Field of Classification Search
CPC .......... F16C 17/03; F16C 17/06; F16C 27/06; F16C 27/000063; F16C 32/0677
See application file for complete search history.

(56) References Cited

U.S. PATENT DOCUMENTS 1,895,936 A 1/1933 Merrill
3,033,619 A * 5/1962 Ertl .................... F16C 17/06
384/308

(Continued)

FOREIGN PATENT DOCUMENTS

| CN | 102308105 A | 1/2012 |
| DE | 102016202167 A1 | 8/2017 |
| GB | 1592033 A | 7/1981 |

OTHER PUBLICATIONS

Extended European Search Report in related European Patent Application No. 17192112.5, dated Mar. 26, 2018. 9 pages.
(Continued)

Primary Examiner — James Pilkington
(74) Attorney, Agent, or Firm — Schmeiser, Olsen & Watts LLP

(57) ABSTRACT

A fluid bearing for a wind turbine including a bearing housing, a plurality of bearing pads inside the bearing housing and circumferentially distributed around a longitudinal axis of the fluid bearing, a plurality of supporting structures, each supporting structure having at least a first interface detachably connected to a respective seat provided in the bearing housing and at least a second interface detachably connected to a respective bearing pad of the plurality of bearing pads, the supporting structure including an elastomer allowing tilting of the respective bearing pad parallel to the longitudinal axis, the elastomer being interposed between the respective seat and the respective bearing pad is provided.

4 Claims, 2 Drawing Sheets

(51) Int. Cl.
*F16C 32/06* (2006.01)
*F03D 80/70* (2016.01)

(52) U.S. Cl.
CPC ......... *F05B 2240/50* (2013.01); *F16C 27/063* (2013.01); *F16C 2300/14* (2013.01); *F16C 2360/31* (2013.01)

(56) References Cited

U.S. PATENT DOCUMENTS

| | | |
|---|---|---|
| 3,930,691 A | 1/1976 | Greene |
| 3,932,004 A | 1/1976 | Orndorff, Jr. |
| 4,268,094 A | 5/1981 | Greene |
| 4,286,828 A * | 9/1981 | Sides ..................... F16C 17/03 384/215 |
| 4,515,486 A * | 5/1985 | Ide ........................ F16C 27/063 384/117 |
| 10,612,586 B2 * | 4/2020 | Frydendal ............... F16C 25/04 |
| 2011/0309628 A1 | 12/2011 | Corts |

OTHER PUBLICATIONS

International Search Report and Written Opinion of the International Search Authority in related PCT Patent Application No. PCT/EP2018/075321, dated Nov. 15, 2018. 14 pages.

Office Action in corresponding Chinese Patent Application No. 201880061411.8 dated Nov. 30, 2020. 6 pages.

Examination Report in related European Patent Application No. 18 782 328.1 dated Apr. 14, 2021. 10 pages.

Office Action in corresponding Chinese Patent Application No. 201880061411.8 dated Jul. 20, 2021. 11 pages.

\* cited by examiner

FLUID FILM BEARING FOR A WIND TURBINE

CROSS-REFERENCE TO RELATED APPLICATIONS

This application claims priority to PCT Application No. PCT/EP2018/075321, having a filing date of Sep. 19, 2018, based on EP 17192112.5, having a filing date of Sep. 20, 2017, the entire contents of both are hereby incorporated by reference.

FIELD OF TECHNOLOGY

The following relates to a fluid film bearing for a wind turbine.

BACKGROUND

In the above described technical field, fluid film bearings, also known as fluid bearing, are used to support a rotating shaft. Fluid film bearing typically comprises a plurality of bearing pads radially distributed around the axis of rotation of the rotating shaft. The fluid film supporting the shaft is formed between the shaft itself and the bearing pads. For each bearing pad a supporting structure is interposed between the pad and a bearing housing.

The supporting structure may be used also for alignment of the bearing pad. To achieve this purpose, each supporting structure allows pivoting of the respective bearing pad parallel to a longitudinal axis of the fluid bearing, i.e. to the axis of rotation of the rotating shaft.

In classical pivot alignment systems provided in known fluid film bearings, fretting in the contact point between relatively tilting components is often experienced. By "fretting" it is meant a type of wear which occurs under load between surfaces in minute relative motion.

Fretting problems are typically experienced in wind turbines applications, due to the high dynamic loading.

A possible solution is to balance the contact stress and relative movement to avoid fretting. This however can be difficult and wind turbine due to huge loads and high dynamics. Supports which minimize pressures between contact surfaces, such as the ball and socket or spheroidal joint, can be used, but they are still not considered as an optimal solution, as they also rely on relative movement.

There may be therefore still a need for providing a new fluid film bearing with improved characteristics with respect to the prior art, in particular as far as fretting wear and correct align are concerned.

SUMMARY

According to the embodiment of the present invention, there is provided a fluid bearing for a wind turbine comprising:
 a bearing housing,
 a plurality of bearing pads inside the bearing housing and circumferentially distributed around a longitudinal axis of the fluid bearing,
 a plurality of supporting structures, each supporting structure having at least a first interface connected to a respective bearing pad of the plurality of bearing pads and at least a second interface connected to a respective seat provided in the bearing housing, wherein the supporting structure comprises an elastomer allowing tilting of the respective bearing pad, the elastomer being interposed between the respective seat and the respective bearing pad and the elastomer being at least partially encased within the seat.

The supporting structure has a certain height between the respective seat and the bearing pad, and the support structure at least one side wall. Encased means that the respective seat support the at least one side wall of the support structure in a direction vertical to the height of the support structure.

Advantageously, the elastomer may be soft enough to ensure an oil film build by correct alignment of the bearing pads. At the same time such a component ensures that fretting wear is avoided. More in general, introducing the elastomer between the tilting pad and the bearing housing minimizes fatigue.

With respect to the known solutions above mentioned, which imply the contact of steel components in relative motion with respect to one another, the elastomer achieves a low surface pressure at the contact interface between the elastomer and steel components of the fluid bearing. Relative movements between components of the supporting structure are avoided.

In respective embodiments of the present invention the elastomer allows tilting of the respective bearing pad parallel and/or orthogonal to the longitudinal axis. Advantageously, this assures the maximum of flexibility for the correct alignment of the bearing pads. Further, the at least partially encasement of the elastomer within the seat secures the elastomer and fixates it further in the intended position even during operation of the bearing.

In other embodiments of the present invention the elastomer is provided as elastomeric layer between the respective seat and the respective bearing pad. In particular, the elastomer may contact the respective seat and is, at least partially, encased within the seat. In an embodiment the elastomeric layer is completely encased (encircled) within the seat. In one embodiment a single elastomeric layer is applied per bearing pad.

In other embodiments of the present invention a plurality of elastomeric layers is provided, each elastomeric layer being interposed between two plates made of an essentially non-compressible material such as a metal, e.g. steel, or made of a polymeric material, and wherein at least one elastomeric layer, at least in part, is encased within the seat. The non-compressible plate material is selected so that it too is flexible, and thereby can retain a good surface-to-surface contact with the at least one elastomeric layer even when the bearing pad is subjected to a load.

According to a specific embodiment of the present invention, the fluid bearing comprises a stack constituted of a plurality of elastomeric layers and of non-compressible plates, each elastomeric layer being interposed between two plates of a non-compressible material, each non-compressible plate being interposed between two elastomeric layers. The plurality of elastomeric layers is provided so that at least one of the elastomeric layers is completely encased (encircled) within the seat. In an alternative embodiment the stack is arranged in a way that all of the elastomeric layers are encased within the seat.

Particularly, the stack may extend between the respective seat and the respective bearing pad.

Advantageously, the use of a stack as above described makes it possible to adjust compressive deformation which may occur in the supporting structure. The stack provides an improved moment resistance to the supporting structure.

The at least one elastomeric layer that, at least in part, is encased within the seat has an interface shape (top and bottom surface in radial direction of the bearing) that essentially matches that of the seat, i.e. the interface contact surface between the two parts when placed in contact with one another have essentially the same shape and surface area. In any case, the interface surface represents a flat surface. The at least one elastomeric layer may however also have an interface shape that is less and different than that of the interface contact surface within the seat, e.g. the surface area being smaller but still having a shape that allows it to easily fit within the seat. Any elastomeric layer extending outside the seat in radial direction may have a larger interface contact surface area and/or surface shape, but such dimensions matches that of the at least one elastomeric layer encased within the seat, i.e. identical elastomeric layers are used in a complete stack. If a stack of elastomeric layers is used, any non-compressible plate may have either an identical/similar or different interface contact surface area and/or surface shape than that of the elastomeric layers. However, any non-compressible plate placed in-between those elastomeric layers encased within the seat have accordingly a contact surface area and shape that allows them to fit and to be easily placed within the seat.

In one embodiment, the elastomeric layer, or at least one layer in a stack of multiple elastomeric layers, is dimensioned so that it is more or less is completely capsulated in-between the side walls (lateral surfaces) of the seat and a top and bottom part, e.g. the plane base and a top component placed in-between the elastomeric layer and the bearing pad and/or in-between plates of a non-compressible material. Thus, the elastomeric layer is surrounded on all sides and dimensioned accordingly. With this arrangement and under a load applied to the bearing pad the capsulated elastomeric layer cannot expand into any cavities that may otherwise be present and thus will act similar to that of a fluid. Opposed to a fluid the elastomer however cannot escape through any openings that may be present and will thus retain its function regardless of the load applied on the bearing pad.

The at least one elastomeric layer may individually be comprised of several identical or different stacks of elastomers elements that combined constitute an elastomeric layer as described herein.

A chosen layout of the elastomers can apply to all of the plurality of bearing pads on the bearing arrangement but could equally be designed differently for individual or groups of the bearing pads independently of one another.

The aspects defined above and further aspects of the present invention are apparent from the examples of embodiment to be described hereinafter and are explained with reference to the examples of embodiment. The embodiments will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

Figure 1:
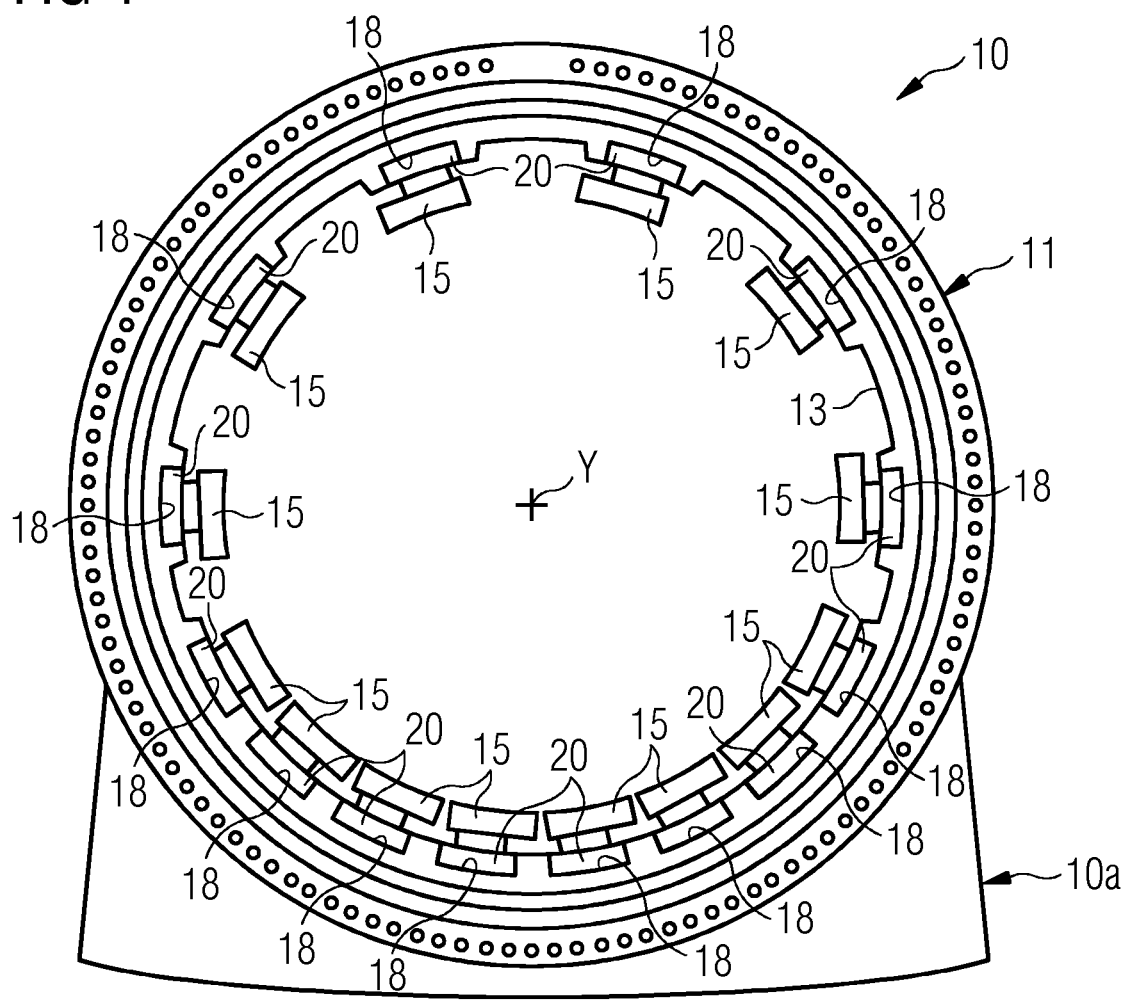
FIG. 1 depicts a schematic sectional view fluid film bearing for a wind turbine according to embodiments of the present invention.

The illustrations in the drawings are schematic. It is noted that in different figures, similar or identical elements or features are provided with the same reference signs. In order to avoid unnecessary repetitions elements or features which have already been described with respect to an embodiment are not described again further in the description.

FIG. 1 partially shows a fluid bearing 10 for a wind turbine (not represented as a whole). The fluid bearing 10 includes a stator portion 10a and a rotor portion (not shown as not being a specific aspect of the present invention), typically a shaft, rotating with respect to the stator portion 10a around a longitudinal axis Y of the fluid bearing.

In the following the terms "longitudinal", "radial" and "circumferential" are referred, when not differently specified, to the longitudinal axis Y of the fluid bearing 10.

The stator portion 10a comprises a plurality of bearing pads 15. In operation of the fluid bearing 10, a thin layer of rapidly moving pressurized liquid or gas is established between the rotor portion and the bearing pads 15. The lack of contact between the moving parts implies that there is no sliding friction, reducing wear and vibration with respect to other types of bearings. How such this thin fluid layer is established is not a specific aspect of the present invention and therefore not described in further detail.

The fluid bearing 10, in the stator portion 10a, includes a bearing housing 11 having a hollow shape circumferentially distributed around the longitudinal axis Y.

The bearing housing 11 comprises an inner surface 13 longitudinally extended. The plurality of bearing pads 15 are provided inside the bearing housing 11, protruding radially from the inner cylindrical surface 13 towards the longitudinal axis Y. The bearing pads 15 are circumferentially distributed around the longitudinal axis Y. The distribution is not regular but takes into account that on a lower portion of the bearing housing 11, due to the gravity, the load is greater. Therefore, with reference to FIG. 1, which represents a vertical sectional view of the fluid bearing 10 in operative position, two bearing pads 15 are provided on a horizontal plane including the longitudinal axis Y, four bearing pads 15 are provided on an upper portion of the bearing housing 11 above the horizontal plane including the longitudinal axis Y and eight bearing pads 15 are provided on an lower portion of the bearing housing 11 below the horizontal plane including the longitudinal axis Y.

According to other possible embodiments of the present invention, a different number and a different distribution of the plurality bearing pads 15 may be implemented.

For each of the bearing pads 15, the fluid bearing 10 includes a supporting structure 20 for connecting the respective bearing pad 15 to the bearing housing 11.

Each supporting structure 20 comprises a first interface 21 connected to a respective seat 18 provided in the bearing housing 11. In particular, each supporting structure 20 may be connected to the respective seat 18 through the respective first interface 21 in a removable manner, so that the supporting structure 20 and the respective bearing pad 15 attached thereto may be, if necessary, removed and substituted with another supporting structure 20. This may happen, for example, for maintenance purposes or when reconfiguring the fluid bearing 10 by substituting one embodiment of supporting structure 20 with another embodiment of supporting structure 20.

The seat 18 is a radial recess provided on the inner surface 13 of the bearing housing 11. The seat has the shape of a parallelepiped having an opening on the inner surface 13, a plane base opposite to the opening and four plane lateral surfaces connecting the plane base to the opening. The seat may however have an alternative shape such as being circular, triangular or other multisided shape, but in any case, any lateral surface has a uniform cross section between the seats plane base and its opening. Accordingly, any lateral surface of the seat recess can encase (encircle) a lateral surface of the elastomer 30 (FIG. 2) here shown as a complete encasement of the elastomer lateral surfaces, but in alternative (not shown) the seat encases the elastomer 30 in part only.

The plane base of the seat 18 is orthogonal to a radial direction of the fluid bearing 10. The four plane lateral surfaces of the seat 18 are orthogonal to a circumferential direction the fluid bearing 10, i.e. practically almost oriented according to a radial direction of the fluid bearing 10.

Consequently, the first interface 21 as a parallelepiped shape for matching the radial recess of the seat 18.

The supporting structure 20 further includes a second interface 22 for connecting the supporting structure 20 to the respective bearing pad 15. The second interface 22 is provided in the supporting structure 20 radially opposite to the first interface 21. In particular, each supporting structure 20 may be connected to the respective bearing pad 15 through the respective second interface 22 in a removable manner, so that the bearing pad 15 may be, if necessary for example during maintenance of the fluid bearing 10, removed and substituted with another bearing pad 15.

According to the present invention, the supporting structure 20 comprises an elastomer 30 allowing tilting of the respective bearing pad 15. The elastomer 30 is interposed between the respective seat 18 and the respective bearing pad 15.

According to respective embodiments of the present invention, bearing pad 15 may tilt parallel to the longitudinal axis Y, i.e. in the plane of the attached figures, or about a direction orthogonal to the longitudinal axis Y or about both directions.

Figure 2:
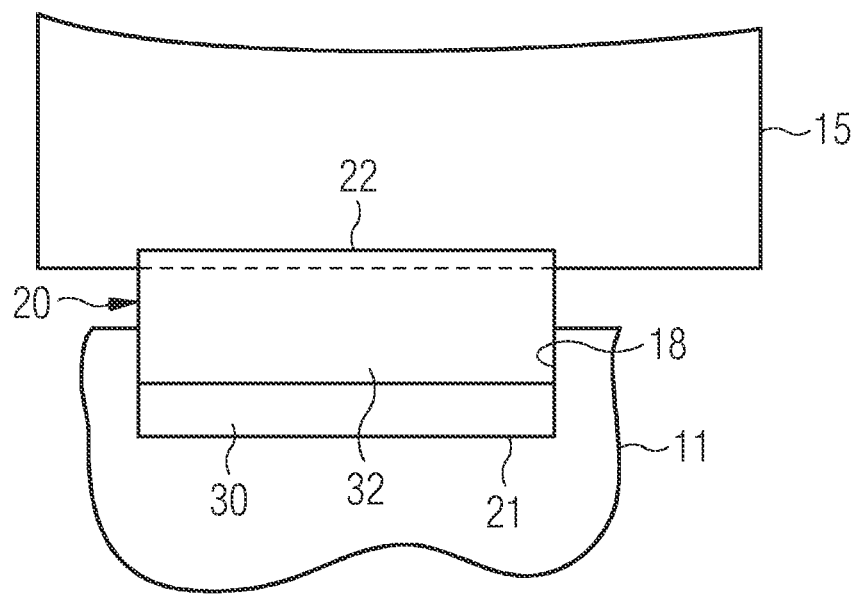
FIG. 2 depicts a schematic sectional view of a first embodiment for a component of the fluid film bearing of FIG. 1.

With reference to FIG. 2, a first embodiment of the supporting structure 20 is shown. Such supporting structure 20 comprises 2 an elastomer 30 provided as an elastomeric layer between the respective seat 18 and the respective bearing pad 15. The elastomeric layer 30 contacts the respective seat 18, the first interface 21 being therefore provided on the elastomeric layer 30. The supporting structure 20 further include a liner 32, e.g. made of steel or other non-compressible material, extending between the elastomeric layer 30 and the respective bearing pad 15. The second interface 22 is therefore provided on the liner 32.

As seen in the embodiment of FIG. 2, the elastomer 30 is encased within the seat 18 and in contact within the lateral surfaces of the seat 18 and completely capsulated within the seat 18, i.e. the elastomer 30 is both encircled on its lateral surfaces by the recess lateral surface and enclosed between the bottom interface surface 21 of this recess and the liner 32 inner surface on top.

According to an alternative embodiment (not shown) of the present invention the radial positions of the elastomeric layer 30 and of the, e.g. steel, liner 32 are inverted, the elastomeric layer 30 being in contact with the respective bearing pad 15 and the liner 32 being in contact with the respective seat 18.

According to another alternative embodiment (not shown) of the present invention the radial position of the elastomer layer 30 is intermediate between the respective seat 18 and the respective bearing pad 15.

Figure 3:
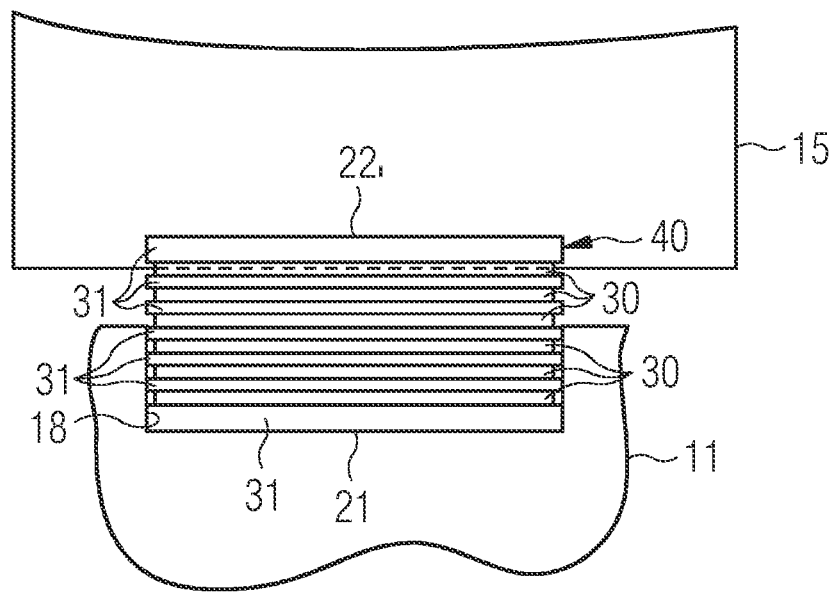
FIG. 3 depicts a schematic sectional view of a second embodiment for the component of the fluid film bearing of FIG. 1.

With reference to FIG. 3, a second embodiment of the supporting structure 20 is shown. Such supporting structure 20 comprises a plurality of elastomeric layers 30 and a plurality of plates 31, each elastomeric layer 30 being radially interposed between two plates 31.

The pluralities of elastomeric layers 30 and of plates 31 constitutes a stack 40 where each elastomeric layer 30 is interposed between two plates 31 and each plate 31 is interposed between two elastomeric layer 30.

The stack 40 extends between the respective seat 18 and the respective bearing pad 15, the first interface 21 and the second interface 22 being respectively provided on two respective plates 31.

The radial thickness and size of the elastomeric layers 30 and of the plates 31 are adjusted to achieve the limiting torsional moment about the longitudinal axis Y, which is needed for the alignment of the bearing pad 15.

As seen in the embodiment of FIG. 3, several of the elastomeric layers 30 are completely encased within the seat 18, i.e. the elastomer is encircled by the lateral surfaces of the seat recess. Further as illustrated, the plates 31 of a non-compressible material are dimensioned (top and bottom surface area) slightly larger than the elastomeric layers 30, and the individual elastomers 30 can thus expand within the cavity formed between two plates 31 when the bearing pad 15 is subjected to a load.

According to alternative embodiments (not shown) one or both of the first interface 21 and the second interface 22 are provided on respective elastomeric layers 30.

According to yet another alternative embodiment (not shown) the stack of layers 40 is arranged in a way that all of the multiple elastomeric layers 30 are encased within the seat, and optionally a liner 32 placed on top of the stack 40 extending between the stack 40 and the respective bearing pad 15.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A fluid bearing for a wind turbine comprising:
a bearing housing;
a plurality of bearing pads inside the bearing housing and circumferentially distributed around a longitudinal axis of the fluid bearing;
a plurality of supporting structures, each supporting structure having at least a first interface connected to a respective seat provided in the bearing housing and at least a second interface connected to a respective bearing pad of the plurality of bearing pads; and
wherein the plurality of supporting structures comprise a plurality of elastomeric layers being interposed between two plates of a non-compressible material to allow a movement of the respective bearing pad, wherein at least some of elastomeric layers are interposed between the respective seat and the respective bearing pad, and completely encased and capsulated within the respective seat.

2. The fluid bearing of claim 1, wherein the elastomeric layers allow the movement of the respective bearing pad parallel and/or orthogonal to the longitudinal axis.

3. A fluid bearing for a wind turbine comprising:
a bearing housing;
a plurality of bearing pads inside the bearing housing and circumferentially distributed around a longitudinal axis of the fluid bearing;
a plurality of supporting structures, each supporting structure having at least a first interface connected to a respective seat provided in the bearing housing and at least a second interface connected to a respective bearing pad of the plurality of bearing pads, wherein the supporting structures are a stack that includes a plurality of elastomeric layers and a plurality of plates made of a non-compressible material, each elastomeric layer of the plurality of elastomeric layers being interposed between two plates of the plurality of plates;
wherein the stack extends between the respective seat and the respective bearing pad and allows a movement of the respective bearing pad.

4. The fluid film bearing of claim 3, wherein at least one of the plurality of elastomeric layers is completely encased within the respective seat.

* * * * *